(12) United States Patent
Takei et al.

(10) Patent No.: US 6,535,670 B1
(45) Date of Patent: Mar. 18, 2003

(54) OPTICAL TRANSMITTER/RECEIVER MODULE AND METHOD OF MANUFACTURING THE SAME

(75) Inventors: Kiyoshi Takei, Tsurugashima (JP); Yoshiaki Watanabe, Tsurugashima (JP); Nong Chen, Tsurugashima (JP); Kiyofumi Chikuma, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/425,939

(22) Filed: Oct. 25, 1999

(30) Foreign Application Priority Data

Oct. 26, 1998 (JP) ............................................. 10-303651

(51) Int. Cl.[7] .............................. G02B 6/26; G02B 6/12
(52) U.S. Cl. .............................. 385/47; 385/39; 385/14
(58) Field of Search .............................. 385/39, 49, 50, 385/14, 88, 89, 92, 47

(56) References Cited

U.S. PATENT DOCUMENTS

| | | | |
|---|---|---|---|
| 4,306,765 A | * 12/1981 | Winzer et al. | |
| 4,693,544 A | * 9/1987 | Yamasaki et al. | |
| 4,790,615 A | * 12/1988 | Seki et al. | |
| 4,989,937 A | * 2/1991 | Mahlein et al. | |
| 5,479,547 A | * 12/1995 | Kunikane et al. | 385/47 |
| 5,497,438 A | * 3/1996 | Ishikawa et al. | 385/38 |
| 5,694,496 A | * 12/1997 | Ando et al. | 385/11 |

OTHER PUBLICATIONS

Ukechi et al. "A new concept for the WDM module using a waveguide equipped with filter" Optical Fiber Communication Conference 2000, vol. 2, pp. 97–99, Mar. 2000.*

Hashimoto et al. "Full duplex 1.3/1.55 um wavelength division multiplexing optical module using a planar lightwave circuit platform" Broadband Optical Networks and Technologies . . . 1998 IEEE/LEOS Summer Topical Meetings, pp. II/59–II/60, Jul. 1998.*

Okano et al. "Passive aligned hybrid integrated optical module using planar lightwave circuit platform" IEEE/LEOS '96, vol. 1, pp. 73–74, Nov. 1996.*

Yamada et al. "Application of planar lightwave circuit platform to hybrid integrated optical WDM transmitter/receiver module" Electronics Letters, vol. 31, No. 16, pp. 1366–1367, Aug. 1995.*

* cited by examiner

Primary Examiner—Rodney Bovernick
Assistant Examiner—Mike Stahl
(74) Attorney, Agent, or Firm—Morgan, Lewis & Bockius LLP

(57) ABSTRACT

An optical transmitter and receiver module de-multiplexes a multi-wavelength optical signal into at least an optical signal of one wavelength band, and receives and transmits the signal. The module includes a first substrate, with a cleavage plane, for supporting input and output wave guides which intersect each other at a portion on the cleavage plane and extend from the portion of intersection at an equal angle with respect to normal at the portion on the cleavage plane. The module also includes an interference filter that is in contact with the cleavage plane on the portion of intersection of the input and output wave guides of the first substrate. Further, the module includes a second substrate, with a cleavage plane in contact with the interference filter, for supporting a transmit/receive wave guide having receiver and transmitter wave guides which extend from the vicinity of the portion of intersection and are separated from each other.

19 Claims, 4 Drawing Sheets

OPTICAL TRANSMITTER/RECEIVER MODULE AND METHOD OF MANUFACTURING THE SAME

BACKGROUND OF THE INVENTION

1. Field of the Invention

The present invention relates to an optical transmitter and receiver module, and particular to an integrated optical transmitter/receiver module.

2. Description of the Related Art

Recently, image information communications have been increasingly more common and attempts to adopt optical cables for communications have been made. Among these attempts, the access system optical communication adopts light waves of a wavelength band centered around 1.3 µm for bidirectional communications between a plurality of subscribers and transmitter stations and at the same time, light waves of a wavelength band centered around 1.55 µm for distributing image information from a transmitter station to the subscribers. In this type of system, it is necessary to install a WDM (Wavelength Division Multiplexing) optical transmitter and receiver module on the subscribers side of the system.

In the optical transmitter and receiver module, a type of module that employs a dielectric multilayer filter, that is, a reflective wavelength de-multiplexer, has received attention since the module realizes isolation over a broad bandwidth (Japanese patent application kokai 8-190026). As shown in FIG. 1, in a prior art optical transmitter and receiver module, single mode wave guides 2, 3, and 2' each having a core contained in a cladding 12 made of quartz-based glass are formed on a silicon substrate 11. Near a position of intersection of wave guides 2 and 3, there is disposed a groove 4 formed with a dicing saw and a dielectric multilayer filter 5 is disposed therein. The optical axis of the wave guide 2' formed opposite to the wave guides 2 and 3 of the dielectric multilayer filter 5 is in alignment with the optical axis of the wave guide 2.

In a planar light-wave circuit 30, an input/output single mode optical fiber 10A and an output single mode optical fiber 10B are fixedly inserted into a glass block 9. The glass block 9 is fixedly bonded to the end face of the circuit so that the optical axes of the input/output and output single mode optical fibers 10A and 10B are in alignment with the optical axes of the wave guides 2 and 3 respectively. Wavelength-multiplexed beams of light of wavelength bands centered around 1.3 µm and 1.55 µm are launched from the input/output port into the wave guide 2. The light beam of a wavelength band centered around 1.55 µm is reflected at the dielectric multilayer filter 5 to be guided into the wave guide 3 and then is coupled into the single mode optical fiber 10B at the end of the wave guide to be outputted. On the other hand, the light beam of a wavelength band centered around 1.3 µm from the wave guide 2 passes through the dielectric multilayer filter 5, i.e., the reflective wavelength multiplexer/de-multiplexer, and enters the wave guide 2'. The wave guide 2' is divided into two at a Y branch 6 in which one of branching wave guide is connected to a laser diode 7 and the other is a photo-diode 8. The laser diode 7 is used for transmitting signals generated from one receiver of the subscribers to the input/output single mode optical fiber 10A, whereas the photo-diode 8 is used for converting the received optical signals into electric signals. Beams of light of a wavelength band centered around 1.55 µm are used, for example, for distributing multi-channel video signals from a transmitter station to the subscribers, while beams of light of a wavelength band centered around 1.3 µm are used in bidirectional communications for transmitting various kinds of data signals.

In the foregoing, there are projections and depressions on the side face of a groove 4 dug and formed with a dicing saw. Accordingly, it is difficult to grind the groove side faces. Moreover, a dielectric multilayer filter 5 is formed by alternately depositing plural layers of $SiO_2$ and $TiO_2$ on a polyimide film of a predetermined thickness so that the dielectric multilayer filter 5 transmits light waves of a wavelength band centered around 1.3 µm and reflects a wavelength band centered around 1.55 µm. In addition, the film of this dielectric multilayer filter is inserted into the groove and fixed with a silicone adhesive 13 and is subject to deterioration with age. Furthermore, there is a problem in that the projections and depressions of the side face of the groove, the adhesive agent, and the plastic film cause the beams of light passing therethrough a great deal of loss in the reflection and transmission.

OBJECT AND SUMMARY OF THE INVENTION

Accordingly, the present invention has been made in view of the problem mentioned above, and its object is to provide an optical transmitter and receiver module, with less optical loss, which can be manufactured easily, and to provide the manufacturing method therefor.

The optical transmitter and receiver module according to the present invention for de-multiplexing a multi-wavelength optical signal into at least an optical signal of one wavelength band, and for receiving and transmitting the optical signal, said optical transmitter and receiver module comprising input/output and output wave guides, a transmit/receive wave guide, a first substrate made of a cleavable crystal, having a cleavage plane, for supporting the input/output and output wave guides which intersect each other at a portion on the cleavage plane from which the input/output and output wave guides extend at an equal angle with respect to a normal line on said cleavage plane;

an interference filter in contact with said cleavage plane on the portion of intersection of the input/output and output wave guides of said first substrate; and a second substrate made of the cleavable crystal having another cleavage plane in contact with said interference filter, for supporting a transmit/receive wave guide having receiver and transmitter wave guides which extend from a vicinity of said portion of intersection and are separated from each other.

In accordance with an aspect of the optical transmitter and receiver module of the invention, the first substrate has a second cleavage plane opposite to the cleavage plane having the portion of intersection on which the input/output and output wave guides terminate.

In accordance with another aspect of the optical transmitter and receiver module of the invention, the second substrate has another second cleavage plane opposite to the cleavage plane in contact with said interference filter on which the receiver and transmitter wave guides of the transmit/receive wave guide terminate.

In accordance with a further aspect of the optical transmitter and receiver module of the invention, the first and second substrate are made of InP, and the input/output and output wave guides and the transmit/receive wave guide are made of InGaAsP.

In accordance with a still further aspect of the optical transmitter and receiver module of the invention, the first and second substrate are made of GaAs, and the input/output and output wave guides and the transmit/receive wave guide are made of AlGaAs.

In accordance with another aspect of the optical transmitter and receiver module of the invention, the input/output and output wave guides and the transmit/receive wave guide are a channel-type three-dimensional wave guide.

In accordance with a further aspect of the optical transmitter and receiver module of the invention, the interference filter comprises a dielectric multilayer filter having a configuration for transmitting an optical signal of a shorter wavelength, and for reflecting an optical signal of a longer wavelength in the multi-wavelength optical signals.

In accordance with a still further aspect of the optical transmitter and receiver module of the invention, the optical transmitter and receiver module further comprises a photodetector and a light emitting device coupled to the receiver and transmitter wave guides of the transmit/receive wave guide respectively.

In accordance with another aspect of the optical transmitter and receiver module of the invention, the first and second substrates have anti-reflection coatings covering the second cleavage planes thereof respectively.

Furthermore, the manufacturing method of the optical transmitter and receiver module according to the present invention for de-multiplexing a multi-wavelength optical signal into at least an optical signal of one wavelength band, and for receiving and transmitting the optical signal, said method comprising a wave guide formation process for forming, on a cleavage crystal substrate, input/output and output wave guides intersecting each other at a portion on a predetermined cleavage plane to be cleaved and extending from the portion of intersection at an equal angle with respect to a normal line at the portion of said cleavage plane, and a transmit/receive wave guide extending from a vicinity of said portion of intersection, the transmit/receive wave guide having receiver and transmitter wave guides being separated from each other;

a cleaving process for cleaving said cleavage crystal substrate in a direction of passing through the portion of intersection so as to form a first substrate for supporting said input/output and output wave guides having a cleavage plane at the portion of intersection and to form a second substrate having another cleavage plane for supporting the transmit/receive wave guide;

an interference filter formation process for covering, with an interference filter, at least a wave guide end face portion of at least one of the cleavage planes of said first substrate and said second substrate; and a joint process for joining together of the cleavage planes of said first and second substrates by pinching said interference filter in order to allow said transmit/receive wave guide to extend from the vicinity of said portion of intersection.

In accordance with an aspect of the method of the invention, the wave guide formation process includes a step of cleaving said cleavage crystal substrate to generate a second cleavage plane opposite to the cleavage plane having the portion of intersection on the first substrate, the input/output and output wave guides terminating on the second cleavage plane.

In accordance with another aspect of the method of the invention, the wave guide formation process includes a step of cleaving said cleavage crystal substrate to generate another second cleavage plane opposite to the cleavage plane on the second substrate, the receiver and transmitter wave guides of the transmit/receive wave guide terminating on the second cleavage plane.

In accordance with a further aspect of the method of the invention, the wave guide formation process includes steps of forming a slab wave guide layer on said cleavage crystal substrate, forming a mask pattern showing a wave guide shape on the slab wave guide layer, etching the slab wave guide layer to form a ridge wave guide.

In accordance with a still further aspect of the method of the invention, the interference filter formation process includes a step of alternately depositing dielectric layers on the cleavage plane to form a dielectric multilayer filter having a configuration for transmitting an optical signal of a shorter wavelength, and for reflecting an optical signal of a longer wavelength in the multi-wavelength optical signals.

In accordance with another aspect of the method of the invention, the method further comprises a step of coating with anti-reflection coatings second cleavage planes opposite to the cleavage planes of the first and second substrates which are formed by cleaving said cleavage crystal substrate.

In accordance with a further aspect of the method of the invention, the joint process includes a step of bonding one of the first and second substrate onto a thermal conductive substrate with a first bonding material and a step of bonding another of the first and second substrate onto the thermal conductive substrate with a second bonding material having a lower melting point than a melting point of the first bonding material.

In accordance with a still further aspect of the method of the invention, the method further comprises a step of connecting the receiver and transmitter wave guides of the transmit/receive wave guide to a photodetector and a light emitting device respectively.

In accordance with another aspect of the method of the invention, the method further comprises a step of forming an elevated bump on the thermal conductive substrate beneath the photodetector and the light emitting device so as to align the optical axes of the receiver and transmitter wave guides to the photodetector and the light emitting device respectively.

In accordance with a further aspect of the method of the invention, the method further comprises a step of forming a concave-shaped portion depressed beneath the photodetector and the light emitting device on the thermal conductive substrate so as to align the optical axes of the receiver and transmitter wave guides to the photodetector and the light emitting device respectively.

According to the present invention, the wave guides and the substrate thereof are formed of a cleavable crystal of a compound semiconductor such as InP and InGaAsP. Accordingly, a de-multiplexing portion of the semiconductor wave guides are cut to cleave once and then the cleaved planes are coated with a dielectric multilayer film, that is, multilayer coating is carried out and thereafter the cleaved planes are joined together. Consequently, the processes are simplified and thus optical transmitter and receiver modules can be manufactured in a simple manner. Moreover, de-multiplexing is performed by the dielectric multilayer filter which is directly formed on the cleavage plane, thereby allowing for providing an improved environmental durability and reduced dependency on the environmental temperature of the de-multiplexing characteristics.

DETAILED DESCRIPTION OF THE PREFERRED EMBODIMENTS

An optical transmitter and receiver module according to an embodiment of the present invention will be described in more detail with reference to the accompanying drawings.

Figure 1:
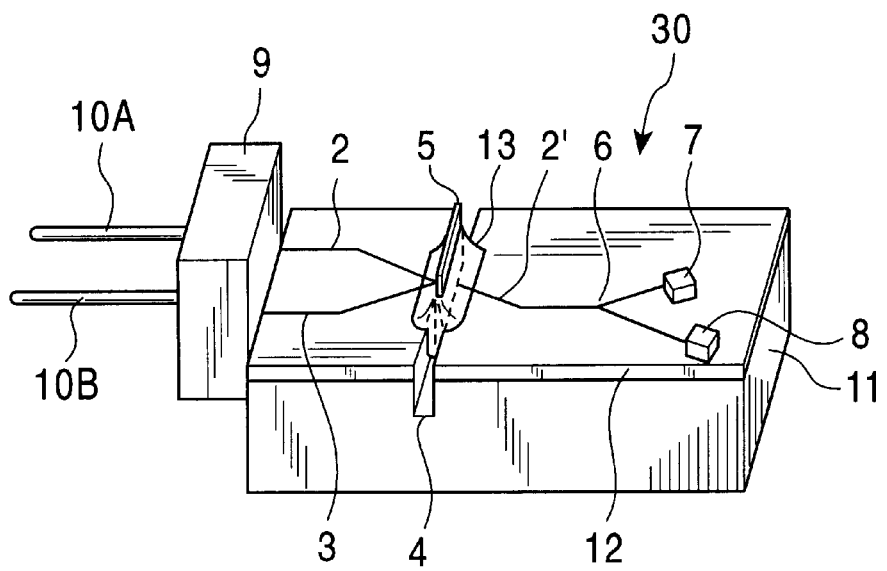
FIG. 1 is a schematic perspective view of a prior art optical transmitter and receiver module.
Figure 2:
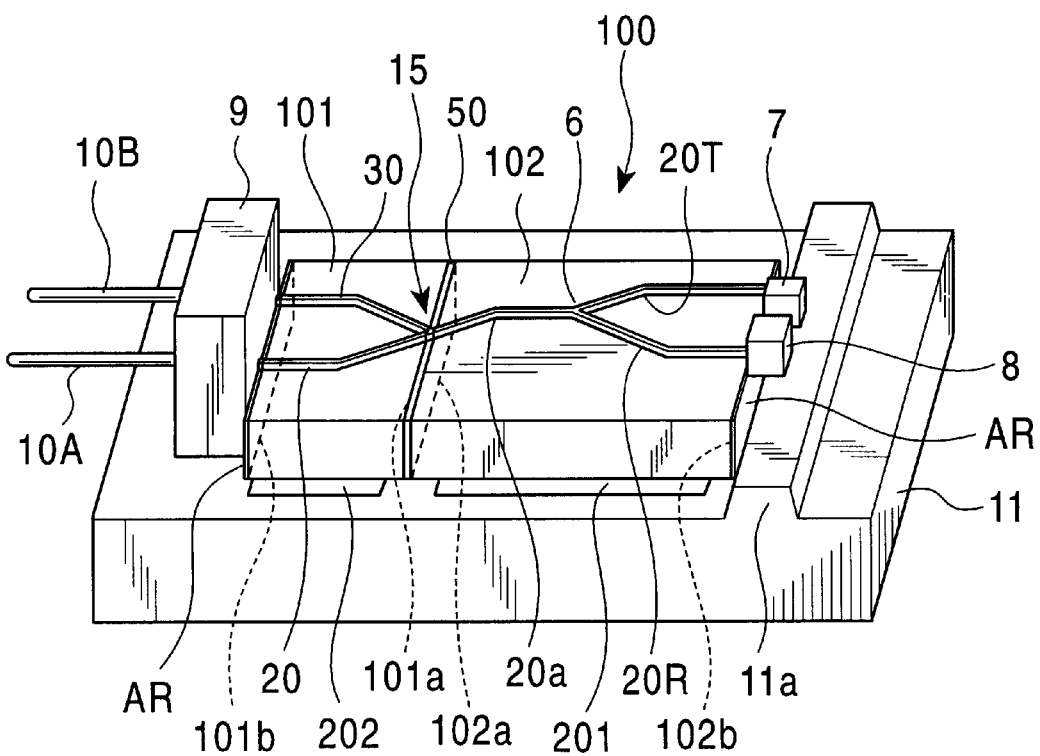
FIG. 2 is a schematic perspective view of an optical transmitter and receiver module of an embodiment of the present invention.

FIG. 2 shows an optical transmitter and receiver module which de-multiplexes a wavelength-multiplexed optical signal of multi-wavelengths of wavelength bands centered around 1.3 μm and 1.55 μm into an optical signal of a wavelength band centered around 1.3 μm, and receives and transmits the signal. The optical transmitter and receiver module has a configuration in which a chip of a planar light-wave circuit 100 is secured to a substrate 11 made of a thermal conductive material such as silicon by first and second bonding materials 201 and 202. The optical transmitter and receiver module has a light-receiving photo-diode 8 as a photodetector and a light-emitting laser diode 7 as a light emitting device to be coupled to receiver and transmitter wave guides 20R and 20T for a wavelength band centered around 1.3 μm, respectively. The planar light-wave circuit 100 comprises a first substrate 101 for supporting input/output and output wave guides 20 and 30, and a second substrate 102 for supporting a transmit/receive wave guide 20a which extends from the input/output wave guide 20 in a common axis. The planar light-wave circuit 100 also has an interference filter 50 formed in-between and in contact with the cleavage planes of the first and second substrates 101 and 102. The interference filter 50 comprises a dielectric multilayer filter having a configuration for transmitting an optical signal of a wavelength band centered around 1.3 μm, the shorter wavelength, and for reflecting an optical signal of a wavelength band centered around 1.55 μm, the longer wavelength in the multi-wavelength optical signals. The first and second substrates 101 and 102 are made of a cleavable crystal compound semiconductor, for example, such as InP. The input/output and output wave guides 20 and 30, and the transmit/receive wave guide 20a are ridge wave guides which are formed from an epitaxial layer of wave guide material InGaAsP deposited on the InP substrate in such a manner that the InGaAsP layer is etched by photolithography. The wave guide material is transparent over the wavelength band of use. The first and second substrates 101 and 102 are separated by cleaving an integrated monolithic InP flat plate, each with a cleavage plane 101a and 102a.

Furthermore, a compound semiconductor made of groups III–V elements such as, for example, GaAs can be used for fabrication of the substrate, and in this case the ridge wave guide is made of AlGaAs.

Still furthermore, the wave guides through which wavelength bands mentioned above propagate are not limited to the ridge wave guide, but a channel-type three-dimensional wave guide may be employed. For the channel-type wave guide, for example, a material that provides transparency depending on the wavelength band of use to give the wave guide a higher refractive index than that of the surrounding cladding layer is diffused from the crystal surface of the substrate. By this diffusion method for making the refractive index of the diffused portion higher than the cladding, a three-dimensional wave guide with a predetermined pattern can be formed or a channel-type wave guide can be also formed by the proton exchange method. Moreover, the channel-type wave guide may be a loading three-dimensional wave guide in which loading a dielectric predetermined pattern to part of a two-dimensional wave guide material layer preformed on a crystal substrate allows, compared with the wave guide material immediately under the dielectric loading portion, an equivalent refractive index of the surrounding wave guide material to be made higher, thereby allowing light to be confined in this portion.

As shown in FIG. 2, the input/output and output wave guides 20 and 30 of the first substrate 101 are formed so as to extend at an equal angle with respect to the normal at a portion of intersection 15 on the cleavage plane 101a in order to intersect each other. This is to reflect and guide light beams of a wavelength band centered around 1.55 μm from the input/output wave guide 20 to the output wave guide 30 by means of an interference filter which is in contact with the cleavage plane at the portion of intersection 15 of the input/output and output wave guides 20 and 30. Both of the input/output and output wave guides 20 and 30 terminate as an input/output port on the other cleavage plane 101b of the first substrate opposite to the portion of intersection 15. The cleavage plane 101b of the first substrate 101 is covered with an anti-reflection coating AR.

The second substrate 102 is in contact with the interference filter 50 on the cleavage plane 102a thereof. The transmit/receive wave guide 20a which extends from the cleavage plane 102a adjacent to the intersection portion 15 has receiver and transmitter wave guides 20R and 20T which separate from each other. Both of the receiver and transmitter wave guides 20R and 20T terminate on the other cleavage plane 102b of the second substrate 102. This is to separate the receiver and transmitter wave guides 20R and 20T into two at the Y branch 6 in order to be coupled to the photo-diode 8 and the laser diode 7, respectively. The other cleavage plane 102b of the second substrate 102 is pre-covered with an anti-reflection coating AR in advance.

In a planar light-wave circuit 100, the input/output single mode optical fiber 10A and the output single mode optical fiber 10B are fixedly inserted into the glass block 9. The glass block 9 is fixedly bonded to the end faces of the input/output ports of the fibers so that the optical axes of the input/output and output single mode optical fibers 10A and 10B are in alignment with the optical axes of the wave guides 20 and 30.

Wavelength-multiplexed beams of light of wavelength bands centered around 1.3 $\mu$m and 1.55 $\mu$m from the input/output single mode optical fiber 10A are launched from the input/output ports into the input and output wave guide 20, and beams of light of a wavelength band centered around 1.55 $\mu$m are reflected at the dielectric multilayer filter 50 to be guided as they are into the output wave guide 30 and then are coupled into the single mode optical fiber 10B at the end of the wave guide to be outputted outwardly. On the other hand, a beam of light of a wavelength band centered around 1.3 $\mu$m from the input and output wave guide 20 passes through an optical filter 5 to be guided into the transmit/receive wave guide 20a and then coupled to the photo-diode 8 and laser diode 7, respectively, at the receiver and transmitter wave guides 20R and 20T which are divided into two beams at the Y branch 6. The laser diode 7 is used for transmitting signals transmitted from the receiver, whereas the photo-diode 8 is used for converting the optical signals received into electric signals, respectively.

The optical transmitter and receiver module is manufactured according to the processes described below.

Figure 3:
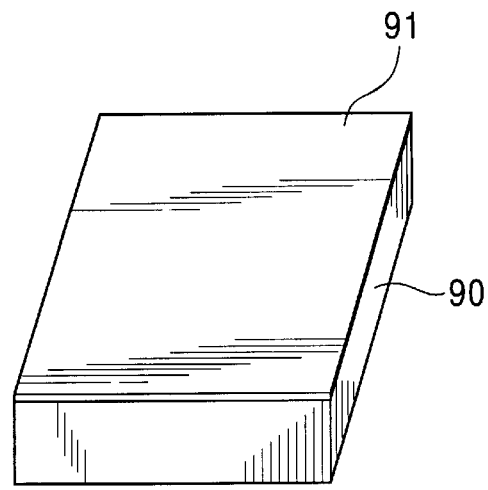
FIG. 3 is a schematic perspective view of a crystal substrate wafer in the manufacturing method for an optical transmitter and receiver module of an embodiment of the present invention.

First, as shown in FIG. 3, a wafer 90 of a cleavable crystal substrate is prepared on which optically transparent wave guides can be formed. As the semiconductor material, for example, cleavable GaAs-based and InP-based semiconductors may be used. The wave guide structure may be of the ridge type or the buried type.

Taking the InP ridge wave guide as an example, an InGaAsP slab wave guide layer 91 is grown as a crystal on the substrate 90 by a technique such as MOCVD. The InGaAsP slab wave guide 91 is to have a composition which is optically transparent to lights with wave lengths of 1.3 $\mu$m and 1.55 $\mu$m. Accordingly, the substrate preferably has a transparency corresponding to the wavelength band in use.

Figure 4:
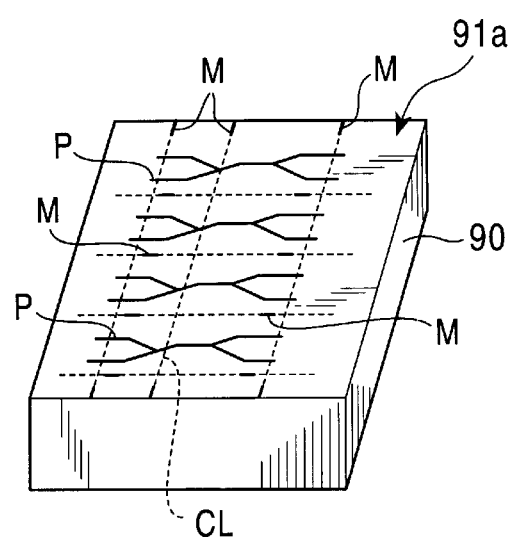
FIG. 4 is a schematic perspective view of a crystal substrate wafer in the manufacturing method for an optical transmitter and receiver module of an embodiment of the present invention.
Figure 5:
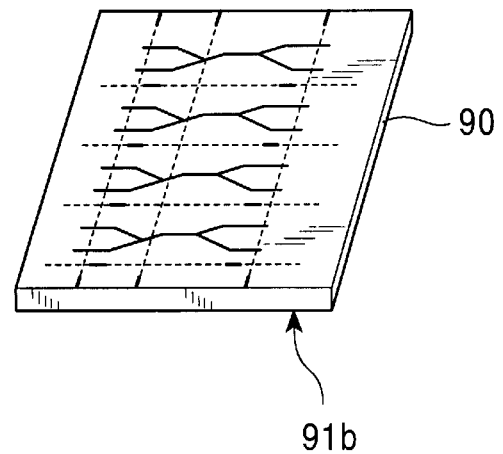
FIG. 5 is a schematic perspective view of a crystal substrate wafer in the manufacturing method for an optical transmitter and receiver module of an embodiment of the present invention.

Now, as shown in FIG. 4, plural mask patterns each showing the wave guide shape and the position of cleavage are patterned on the surface of the wafer 91a i.e., the slab wave guide layer 91 and then the wave guide layer 91 processed by etching through a photolithography method to form three-dimensional wave guides P as ridge wave guides, as shown in FIG. 5. Simultaneously, the markers M are also etched. The positioning using the markers M of CL is particularly important, since the cleavage markers CL show the optical de-multiplexing position to be cleaved. The ridge wave guides 20, 30, and 20a are thus formed through etching as shown in FIG. 2, resulting in a three-dimensional wave guides. Next, as shown in FIG. 5, the rear surface 91b of the substrate 90 is ground into a cleavable thickness.

Figure 6:
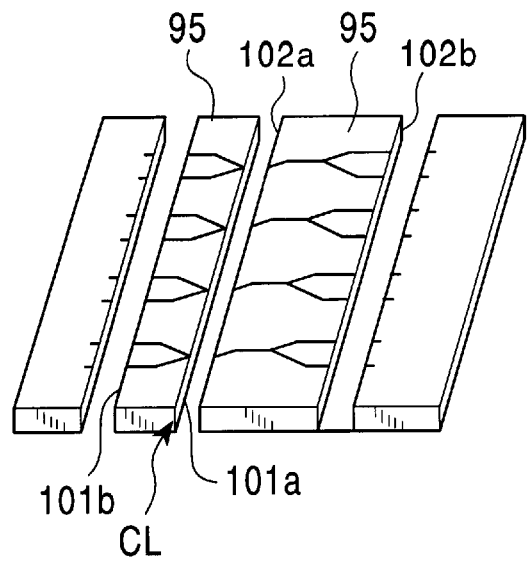
FIG. 6 is a schematic perspective view of wave guide bars in the manufacturing method for an optical transmitter and receiver module of an embodiment of the present invention.

Next, as shown in FIG. 6, cleaved at the marker position of the optical de-multiplexing position CL to be cleaved, the ground thin substrate 90 is divided into bars for being processed and thus the wave guide bars 95 are manufactured.

Figure 7:
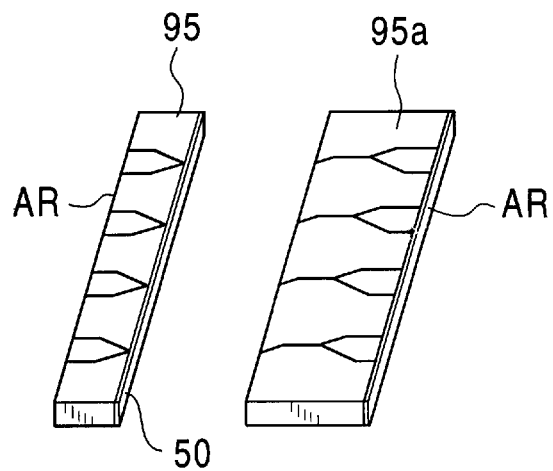
FIG. 7 is a schematic perspective view of wave guide bars in the manufacturing method for an optical transmitter and receiver module of an embodiment of the present invention.

Subsequently, as shown in FIG. 7, by vacuum deposition or magnetron sputtering, dielectrics such as $SiO_2$, $TiO_2$, or the like are alternately deposited on the cleavage plane 101a of the wave guide bar 95, so as to form the first substrate 101, as shown in FIG. 2. This enables depositing of dielectric multilayer films of the interference filter 50 so as to form the interference filter 50 for optical de-multiplexing. Among the cleavage planes, an interference filter may be coated at least on a wave guide end face portion of at least one of the faces. Since the dielectric multilayer film 50 is to be pinched when later incorporated into an optical circuit module by coupling, the film may be formed on either the cleavage plane 101a or the cleavage plane 102a, which are opposite to each other, of the wave guide bars 95 and 95a.

The anti-reflection film AR for the wavelength bands centered around 1.3 $\mu$m and 1.55 $\mu$m is formed to coat the cleavage plane 101b of the opposite side of the wave guide bar 95. Also, the anti-reflection film AR for the wavelength bands centered around 1.3 $\mu$m is formed to coat the cleavage plane 102b of the opposite side of the other wave guide bar 95a which is to become the second substrate 102 shown in FIG. 2.

Figure 8:
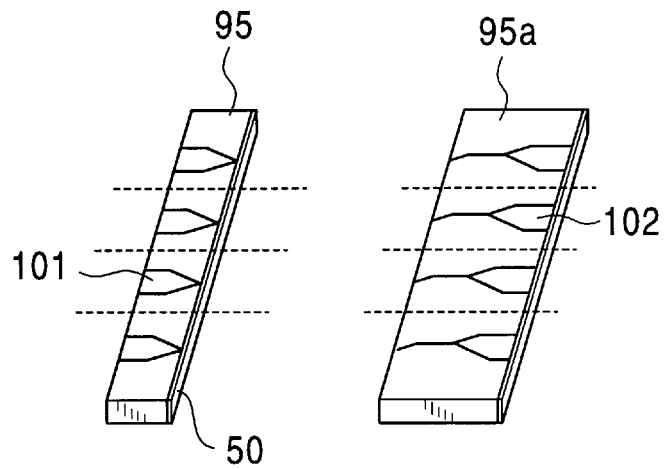
FIG. 8 is a schematic perspective view of wave guide bars in the manufacturing method for an optical transmitter and receiver module of an embodiment of the present invention.

Then, as shown in FIG. 8 by dashed lines, each of the wave guide bars of the first and second substrates 101 and 102 is further cleaved into an individual wave guide chip.

Since both wave guide chips are pre-patterned with alignment markers for positioning, the individual chips are joined to the marker, for example, on a thermally conductive substrate such as a silicon substrate. In addition, another method is also available for joining the individual wave guide chips while the wave guide bar is being positioned by introducing beams of light into the wave guide bar.

Figure 9:
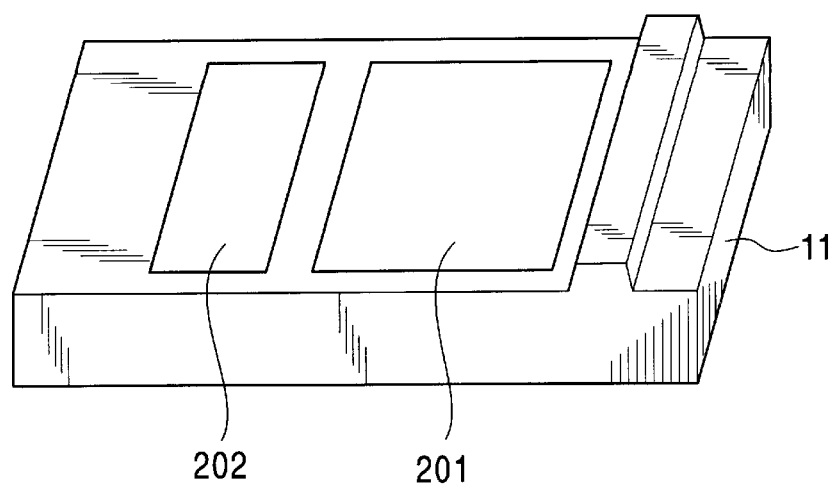
FIG. 9 is a schematic perspective view of a thermal conductive substrate and wave guide chip in the manufacturing method for an optical transmitter and receiver module of an embodiment of the present invention.

Now, as shown in FIG. 9, in the process of bonding the first substrate to the second, at the time of connecting one wave guide chip, it is necessary to have the other wave guide chip secured to the silicon substrate 11. Therefore, first and second bonding materials 201 and 202, which have different melting points, are deposited on the silicon substrate 11. In this embodiment, the first bonding material 201 has a higher melting point than the second bonding material 202.

Figure 10:
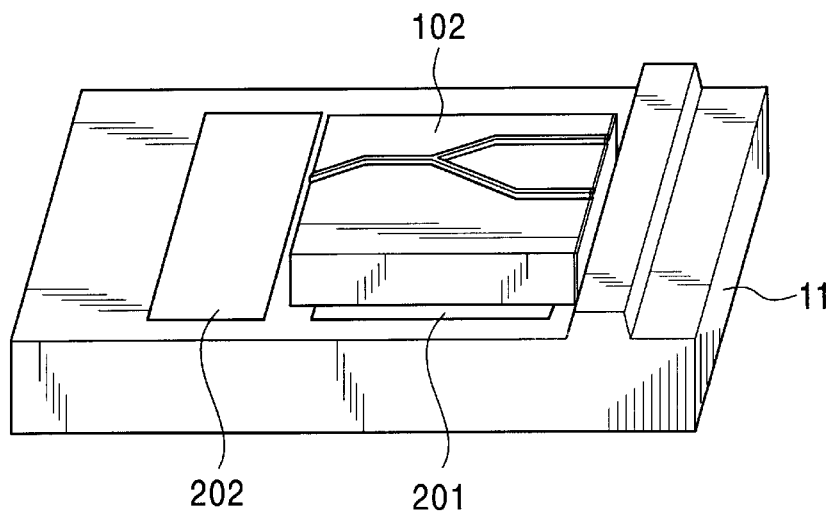
FIG. 10 is a schematic perspective view of a thermal conductive substrate and wave guide chip in the manufacturing method for an optical transmitter and receiver module of an embodiment of the present invention.

Now, as shown in FIG. 10, the silicon substrate 11 is heated to exceed the melting point of the first bonding material 201 and one of the wave guide chips, for example, the second substrate 102 is bonded onto the silicon substrate 11 according to the marker.

Figure 11:
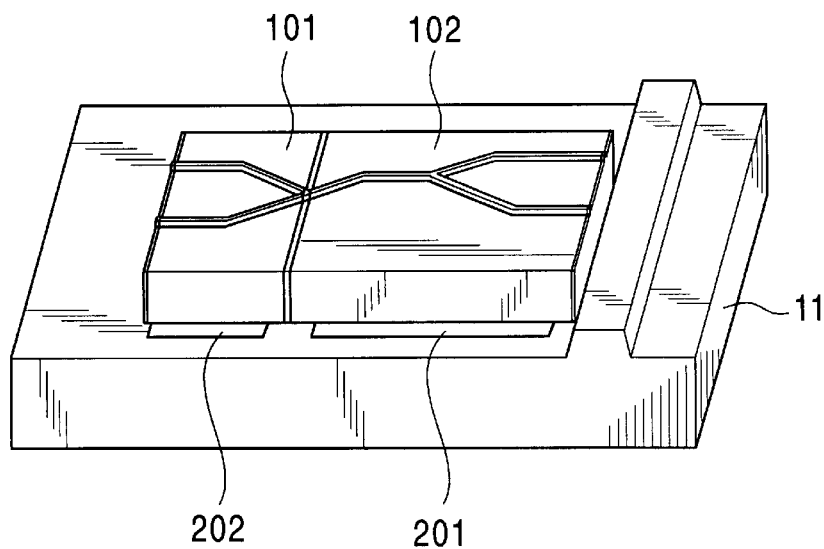
FIG. 11 is a schematic perspective view of a thermal conductive substrate and wave guide chip in the manufacturing method for an optical transmitter and receiver module of an embodiment of the present invention.

Subsequently, as shown in FIG. 11, the temperature is raised so that only the second bonding material 202 with a lower melting point melts. Then, the first substrate 101, the other of the wave guide chips, is aligned for bonding so that the transmit/receive wave guide 20a extends from the vicinity of the intersection portion 15 in alignment with the optical axis of the input and output wave guides 20. Then, as shown in FIG. 2, the transmitter laser diode 7 and the receiver photo-diode 8 are secured to the silicon substrate 11 at the end portion of the corresponding wave guides so as to connect with the transmitter and receiver wave guides 20T and 20R, respectively. For the alignment in height to the corresponding wave guide and heat radiation of the transmitter laser diode 7 and the receiver photo-diode 8, a Si terrace 11a could be provided as an elevated bump on the silicon substrate 11. Moreover, in stead of the Si terrace 11a, a "concave"-shaped portion depressed at the bonding portion of the laser diode 7 and photo-diode 8 may be formed to align their optical axes to the receiver and transmitter wave guides.

What is claimed is:

1. An optical transmitter and receiver module for de-multiplexing a multi-wavelength optical signal into at least an optical signal of one wavelength band, and for receiving and transmitting the optical signal, said optical transmitter and receiver module comprising:

input/output and output wave guides wherein the input/output wave guide carries first and second wavelength bands and is configured to output the first wavelength band and to reflect the second wavelength band, and the output wave guide carries the reflected second wavelength band;

a transmit/receive wave guide for transmitting and receiving the first wavelength band output from the input/output wave guide;

a first substrate made of a cleavable crystal, having a cleavage plane, for supporting the input/output and output wave guides which intersect each other at a portion on the cleavage plane from which the input/output and output wave guides extend at an equal angle with respect to a normal line on said cleavage plane;

an interference filter in contact with said cleavage plane on the portion of intersection of the input/output and output wave guides of said first substrate; and a second substrate made of the cleavable crystal having another cleavage plane in contact with said interference filter, for supporting the transmit/receive wave guide having receiver and transmitter wave guides which extend from a vicinity of said portion of intersection and are separated from each other.

2. An optical transmitter and receiver module according to claim 1, wherein the first substrate has a second cleavage plane opposite to the cleavage plane having the portion of intersection on which the input/output and output wave guides terminate.

3. An optical transmitter and receiver module according to claim 1, wherein the second substrate has a second cleavage plane opposite to the cleavage plane in contact with said interference filter on which the receiver and transmitter wave guides of the transmit/receive wave guide terminate.

4. An optical transmitter and receiver module according to claim 1, wherein the first and second substrate are made of InP, and the input/output and output wave guides and the transmit/receive wave guide are made of InGaAsP.

5. An optical transmitter and receiver module according to claim 1, wherein the first and second substrate are made of GaAs, and the input/output and output wave guides and the transmit/receive wave guide are made of AlGaAs.

6. An optical transmitter and receiver module according to claim 1, wherein the input/output and output wave guides and the transmit/receive wave guide are a channel-type three-dimensional wave guide.

7. An optical transmitter and receiver module according to claim 1, wherein the interference filter comprises a dielectric multilayer filter having a configuration for transmitting an optical signal of a shorter wavelength, and for reflecting an optical signal of a longer wavelength in the multi-wavelength optical signals.

8. An optical transmitter and receiver module according to claim 1 further comprising a photodetector and a light emitting device coupled to the receiver and transmitter wave guides of the transmit/receive wave guide respectively.

9. An optical transmitter and receiver module according to claim 1, wherein the first and second substrates have anti-reflection coatings covering the cleavage planes thereof respectively.

10. A method for manufacturing an optical transmitter and receiver module for de-multiplexing a multi-wavelength optical signal into at least an optical signal of one wavelength band, and for receiving and transmitting the optical signal, said method comprising:

a wave guide formation process for forming, on a cleavage crystal substrate, input/output and output wave guides intersecting each other at a portion on a predetermined cleavage plane to be cleaved and extending from the portion of intersection at an equal angle with respect to a normal line at the portion of said cleavage plane, wherein the input/output wave guide carries first and second wavelength bands and is configured to output the first wavelength band and to reflect the second wavelength band, and the output wave guide carries the reflected second wavelength band, and a transmit/receive wave guide extending from a vicinity of said portion of intersection, the transmit/receive wave guide having receiver and transmitter wave guides being separated from each other and transmitting and receiving the first wavelength band output from the input/output wave guide;

a cleaving process for cleaving said cleavage crystal substrate in a direction of passing through the portion of intersection so as to form a first substrate for supporting said input/output and output wave guides having a cleavage plane at the portion of intersection and to form a second substrate having another cleavage plane for supporting the transmit/receive wave guide;

an interference filter formation process for covering, with an interference filter, at least a wave guide end face portion of at least one of the cleavage planes of said first substrate and said second substrate; and a joint process for joining together of the cleavage planes of said first and second substrates by pinching said interference filter in order to allow said transmit/receive wave guide to extend from the vicinity of said portion of intersection.

11. A method according to claim 10, wherein the wave guide formation process includes a step of cleaving said cleavage crystal substrate to generate a second cleavage plane opposite to the cleavage plane having the portion of intersection on the first substrate, the input/output and output wave guides terminating on the second cleavage plane.

12. A method according to claim 10, wherein the wave guide formation process includes a step of cleaving said cleavage crystal substrate to generate a second cleavage plane opposite to the cleavage plane on the second substrate, the receiver and transmitter wave guides of the transmit/receive wave guide terminating on the second cleavage plane.

13. A method according to claim 10, wherein the wave guide formation process includes steps of forming a slab wave guide layer on said cleavage crystal substrate, forming a mask pattern showing a wave guide shape on the slab wave guide layer, etching the slab wave guide layer to form a ridge wave guide.

14. A method according to claim 10, wherein the interference filter formation process includes a step of alternately depositing dielectric layers on the cleavage plane to form a dielectric multilayer filter having a configuration for transmitting an optical signal of a shorter wavelength, and for reflecting an optical signal of a longer wavelength in the multi-wavelength optical signals.

15. A method according to claim 10 further comprising a step of coating with anti-reflection coatings second cleavage planes opposite to the cleavage planes of the first and second substrates which are formed by cleaving said cleavage crystal substrate.

16. A method according to claim 10, wherein the joint process includes a step of bonding one of the first and second substrate onto a thermal conductive substrate with a first bonding material and a step of bonding another of the first and second substrate onto the thermal conductive substrate with a second bonding material having a lower melting point than a melting point of the first bonding material.

17. A method according to claim 10 further comprising a step of connecting the receiver and transmitter wave guides of the transmit/receive wave guide to a photodetector and a light emitting device respectively.

18. A method according to claim 17, further comprising a step of forming an elevated bump on a thermal conductive substrate beneath the photodetector and the light emitting device so as to align the optical axes of the receiver and transmitter wave guides to the photodetector and the light emitting device respectively.

19. A method according to claim 17 further comprising the step of forming a concave-shaped portion depressed beneath the protodetector and the light emitting device on a thermal conductive substrate so as to align the optical axes of the receiver and transmitter wave guides to the photodetector and the light emitting device respectively.

* * * * *